United States Patent

Solvason

[19]

[11] Patent Number: 6,003,073
[45] Date of Patent: Dec. 14, 1999

[54] METHOD AND A SYSTEM FOR COMMUNICATION OF CONTROL INFORMATION FROM A CONTROL INFORMATION GENERATOR TO ONE OR MORE COMPUTER INSTALLATIONS

[76] Inventor: Ivan Solvason, 225 Rosecrans Pl., Manhattan Beach, Calif. 90266

[21] Appl. No.: 08/765,835
[22] PCT Filed: Jan. 26, 1996
[86] PCT No.: PCT/DK96/00044
 § 371 Date: May 7, 1997
 § 102(e) Date: May 7, 1997
[87] PCT Pub. No.: WO97/27683
 PCT Pub. Date: Jul. 31, 1997

[51] Int. Cl.⁶ .................................................. G06F 13/00
[52] U.S. Cl. ................................. 709/219; 709/246
[58] Field of Search ........................... 340/825.44; 348/7, 348/8, 584, 1, 13, 405, 589; 709/200, 201, 203, 217, 218, 219, 236, 246

[56] References Cited

U.S. PATENT DOCUMENTS 5,189,630   2/1993   Barstow et al. ...................... 709/246
5,491,508   2/1996   Friedell et al. ...................... 348/16
5,592,551   1/1997   Lett et al. .......................... 380/20
5,694,163   12/1997  Harrison ............................ 348/13
5,833,468   11/1998  Guy et al. .......................... 348/13

FOREIGN PATENT DOCUMENTS

0152341A1   8/1985   European Pat. Off. .
0601437A1   6/1994   European Pat. Off. .
2702613A1   9/1997   France .
WO9103891   3/1991   WIPO .
WO9528044   10/1995  WIPO .

*Primary Examiner*—Moustafa M. Meky
*Attorney, Agent, or Firm*—Sughrue, Mion, Zinn, Macpeak & Seas, PLLC

[57] ABSTRACT

A control information message is communicated from a control information generator and encoder (3) in a server installation (1) to one or more computer installations (2) by encoding the message into a single sequence of a relatively short duration, which is incorporated into an overall audio or video information carrying signal and transmitted to the user computer installation through a wired or wireless transmission media. In the user computer installations the received signal sequence is retrieved from the overall signal and decoded into the original message which is then used to initiate an action controlled by a prestored program in the user computer installation (2).

41 Claims, 7 Drawing Sheets

| Tone description | Frequency (Hz) |
|---|---|
| Data value "1" | 1124 |
| Data value "2" | 1197 |
| Data value "3" | 1275 |
| Data value "4" | 1358 |
| Data value "5" | 1446 |
| Data value "6" | 1540 |
| Data value "7" | 1640 |
| Data value "8" | 1747 |
| Data value "9" | 1860 |
| Data value "0" | 1981 |
| Repeat Indicator | 2110 |
| Start Indicator | 2247 |
| End Indicator | 2400 |

FIG. 5

| Tone description | Low frequency (Hz) | High frequency (Hz) |
|---|---|---|
| Data value "1" | 697.1250 | 1210.9375 |
| Data value "2" | 697.1250 | 1367.1175 |
| Data value "3" | 697.1250 | 1523.4375 |
| Data value "4" | 820.3125 | 1210.9375 |
| Data value "5" | 820.3125 | 1367.1175 |
| Data value "6" | 820.3125 | 1523.4375 |
| Data value "7" | 937.5000 | 1210.9375 |
| Data value "8" | 937.5000 | 1367.1175 |
| Data value "9" | 937.5000 | 1523.4375 |
| Data value "0" | 1054.6875 | 1210.9375 |
| Repeat Indicator | 1054.6875 | 1367.1175 |
| Start Indicator | 1054.6875 | 1523.4375 |
| End Indicator | 1054.6875 | 1718.7500 |

METHOD AND A SYSTEM FOR COMMUNICATION OF CONTROL INFORMATION FROM A CONTROL INFORMATION GENERATOR TO ONE OR MORE COMPUTER INSTALLATIONS

FIELD OF THE INVENTION

This invention relates to a method and a system for initiating an action controlled by a prestored programme in one or more computer installations by communication of control information message from a control information generator in a server installation remote from said one or more computer installations.

From television entertainment it is known to provide for interactive viewer participation in performance of a video game forming part of a broadcast television programme. One example is a video game in which an animated cartoon figure is guided through a labyrinth by instructions from a viewer using his standard push button telephone set, whereby operations of specific digit keys of the telephone set keyboard causes the cartoon figure to move in specific predetermined ways through the labyrinth such as moving forwards, to the right or left or circumventing obstructions.

U.S. Pat. No. 5,189,630 discloses a method for encoding and broadcasting information about live events using computer pattern matching techniques, by which a live event may be broadcast with a combination signal including a computer coded description of subevents constituting the event and an audio or video signal. In a viewer's computer an indication is thereby provided to the viewer of the occurrence of subevents of interest and the viewer of the event is allowed to search for such subevents in a recording of the event. In a specific embodiment of this method the encoded description of the event may include status information in its representation of subevents and be combined with other signals such as an audio signal or a video signal to produce a combined signal which is transmitted to a viewer with a computer.

BRIEF SUMMARY OF THE INVENTION

As will appear from the following description the method and system according to the invention have numerous applications, but in broad terms it is a main object of the invention to enable control of one or more computer installations by transmission of a control information signal sequence of a relatively short duration as part of an audio and/or video information carrying signal to initiate certain actions controlled by one or more prestored programmes in such computer installations.

By an audio and/or video information carrying signal is in this context understood an analog audio and/or video signal generated and transmitted by conventional means as well as audio and/or video information converted into and transmitted as digital signals.

In accordance with the above main object the invention provides in its broadest aspect a method for initiating an action controlled by a prestored programme in one or more computer installations by communication of a control information message from a control information generator in a server installation remote from said one or more computer installations, comprising the steps of generating said control information message in the control information generator as a message of alpha-numeric information, encoding said message into a signal sequence of a relatively short duration, adding a start indicator signal and an end indicator signal at the beginning an end of said signal sequence, incorporating said signal sequence with said start and end indicator signals into an overall audio or video information carrying signal comprising signal parts from other signal sources than said control information generator, communicating said overall signal to said one or more computer installations, retrieving said signal sequence from said overall signal at each of said computer installations, decoding said signal sequence into said message of alpha-numeric information, and using said message to initiate said action in each of said computer installations, said action being of a duration substantially longer than said relatively short duration.

In a relatively simple preferred embodiment the control information signal sequence may comprise a series of audio signals representing individual characters (letters, digits) of said message of alpha-numeric information, and said start and end indicator signals are audio signal distinct from said character representing signals.

The overall audio or video signal into which the audio signal containing the control information is incorporated may typically form part of a broadcast radio or television signal. The control information communicated in this way may be used by any member of the listening or viewing public having access to a personal computer equipped with means to retrieve and use the control information, including a computer programme in which certain actions can be initiated by the control information.

However, an addressed communication of the control information may also be foreseen through the provision of person identification information at each of said computer installations to identify data for a user of said installation as belonging to any of a number of specific groups of persons, where each groups is defined by at least one common personal data parameter, and the further steps of adding addressing information to the message generated by said control information generator to address at least one of said groups and using the reconverted massages in the corresponding computer installations to initiate a prestored computer programme specific for said group or groups.

In its structural aspect the invention provides a system for initiating an action controlled by a prestored programme in one or more computer installations by communication of control information from a control information generator remote from said one or more computer installations, said control information generator comprising means for generating said control information in the form of a message of alpha-numeric information, means for encoding said message into a signal sequence of a relatively short duration, said control information generator forming part of a server installation comprising means for incorporating said signal sequence into an overall audio and/or video information carrying signal comprising signal parts from other sources than said control information generator, means for adding a start indicator signal and an end indicator signal at the beginning and end of said sequence, and means for communicating said overall signal including said signal sequence with said start and end indicator signals to said one or more computer installations, and each of said computer installations comprising means for retrieving said signal sequence from said overall signal, means for decoding said signal sequence into said message of alpha-numeric information, and means for using said message to initiate said action controlled in each of said computer installations, said action being of a duration substantially longer than said relatively short duration.

For the above-mentioned relatively simple embodiment of forming the control information signal sequence as a series of audio signals said encoding means may comprise means for converting said message into a series of audio signals representing individual characters (letters, digits) of said alpha-numeric information and said receiver device may comprise an audio receiver part.

The server installation may form part of a broadcasting system or it may comprise recording means for recording the overall audio and/or video carrying signal on a record carrier, whereby each of said computer installations must comprise a playback apparatus for said record carrier.

DESCRIPTION OF SEVERAL VIEWS OF THE DRAWINGS

The method and the system according to the invention and a number of non-limiting applications thereof will be explained in more detail in the following with reference to the accompanying schematical drawings, in which.

DETAILED DESCRIPTION OF THE INVENTION

Figure 1:
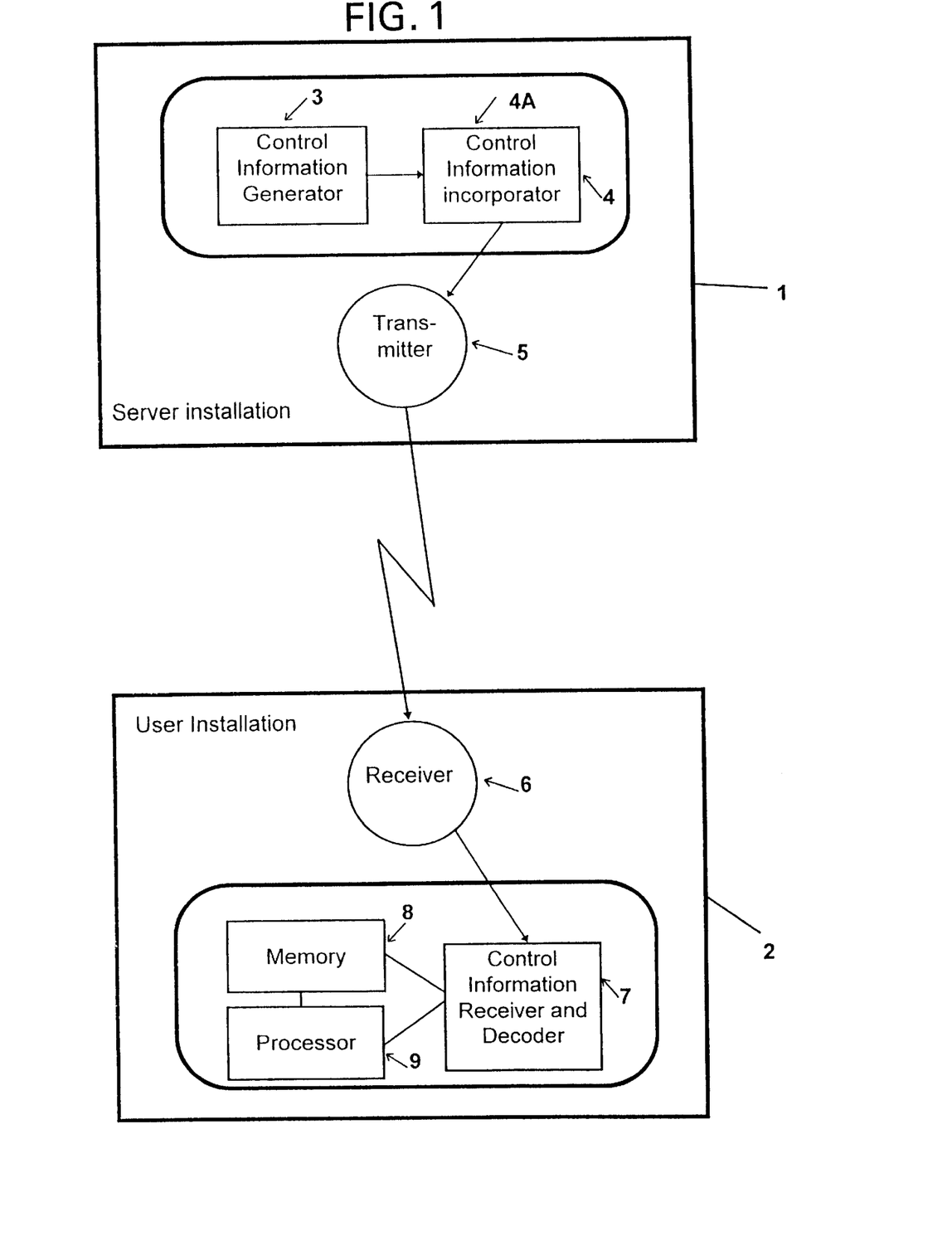
FIG. 1 is a general representation of the main constituents of the system of the invention.

The schematical representation in FIG. 1 shows an embodiment of a communication system according to the invention comprising a server installation 1 transmitting an overall signal containing audio and/or video information such as a conventional analog radio or television signal, which is received by a number of user installations 2, only one of which is represented in the figure.

In the embodiment shown, the main constituents of the server installation 1 are a control information generator and encoder 3, by means of which a control information message containing a limited number of alpha-numeric characters is generated and encoded into a signal sequence of a relatively short duration composed of a series of simple audio signals representing the individual characters of the message, a device 4 for adding or incorporating the control information message generated by the control information encoder 3 into the overall signal carrying audio and/or video information comprising signal parts as indicated by arrow 4A supplied from other signal sources, not shown, than the control information encoder 3, and a transmitter device 5 for transmission of the overall signal with the incorporated control information message.

Correspondingly, the user installation 2 comprises a receiver device 6 for receiving the overall signal transmitted by the server installation 1, a control information message retriever and decoder 7 for retrieving the control information carrying audio signal sequence from the overall signal received by the receiving device 6 and decoding this signal sequence into the original alpha-numeric control information message incorporated in the overall signal in the server installation 1, a data processor 9 and a memory 8 with at least one prestored programme controlling the performance of an action or certain actions initiated in response to the control information message received from the server installation 1 as part of the transmitted overall audio or video information carrying signal.

Figure 2:
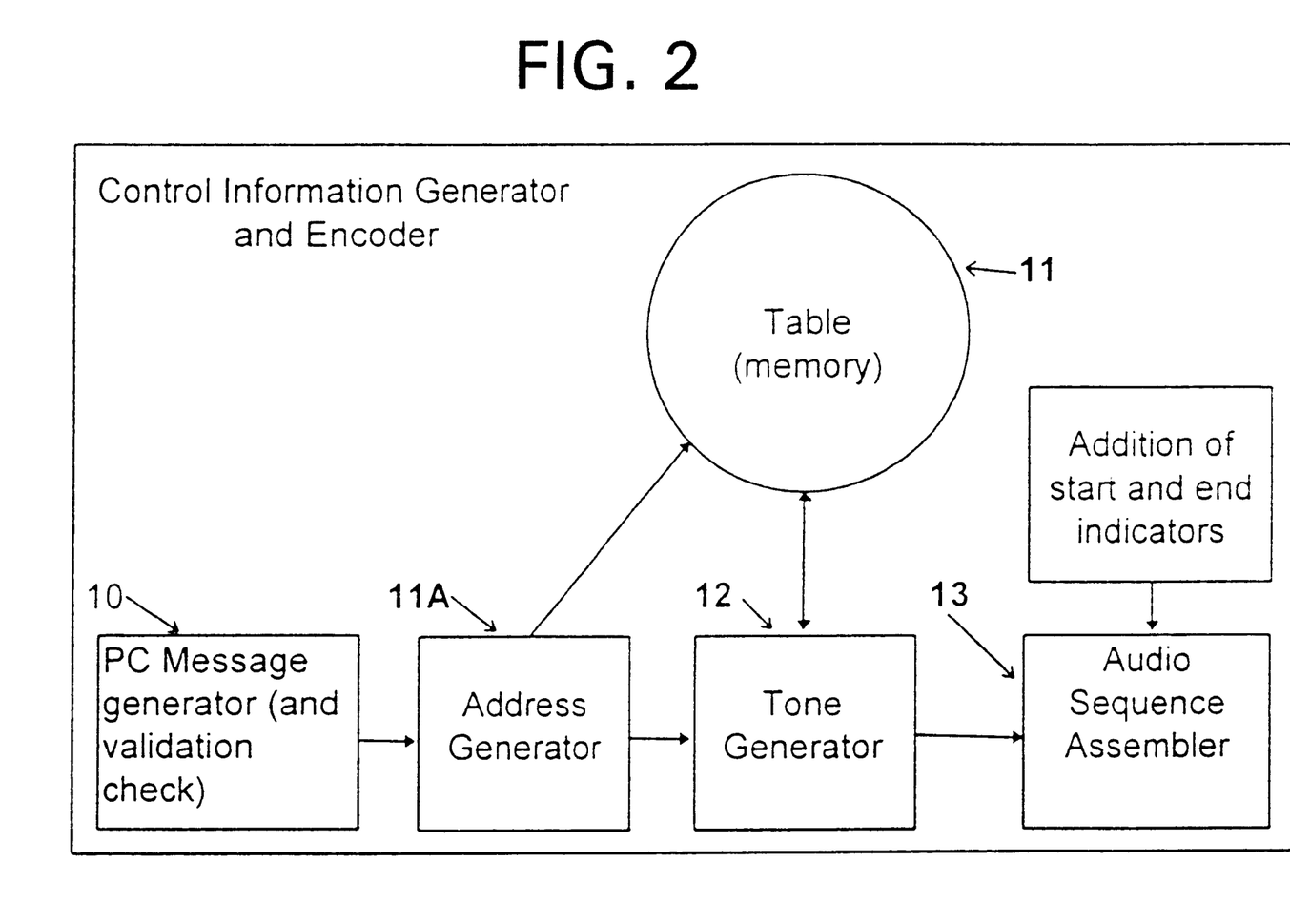
FIG. 2 illustrates the generation and encoding of a simple control information containing an audio signal sequences by the method of the invention.

FIG. 2 shows the main parts and illustrates the data and signal processing in the control information generator and encoder 3 in the server installation 1.

The alpha-numeric control information message is typically generated by a personal computer 10 controlled by dedicated software for generation of a message which can be incorporated into an overall audio and/or video information carrying signal and retrieved again from this overall signal.

The significant information carrying part of the control information message is entered from the keyboard of the personal computer 10 in form of a sequence of a limited number of characters ranging typically from 10 to 150 characters.

Figure 4:
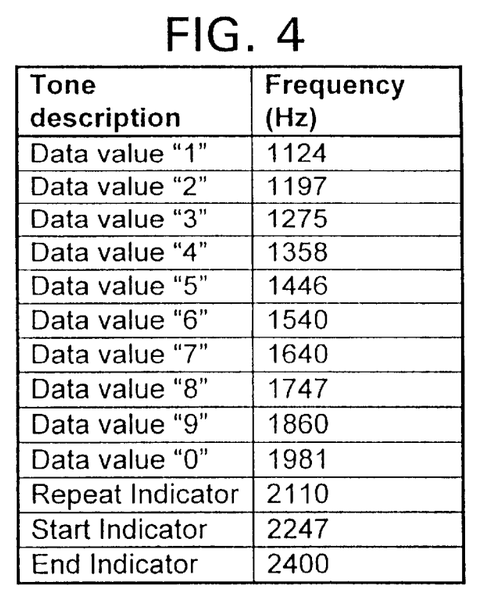
FIGS. 4 and 5 are examples of signal and dual tone conversion schemes for digit-by-digit conversion of numeric control information into simple single or dual tone signals.
Figure 5:
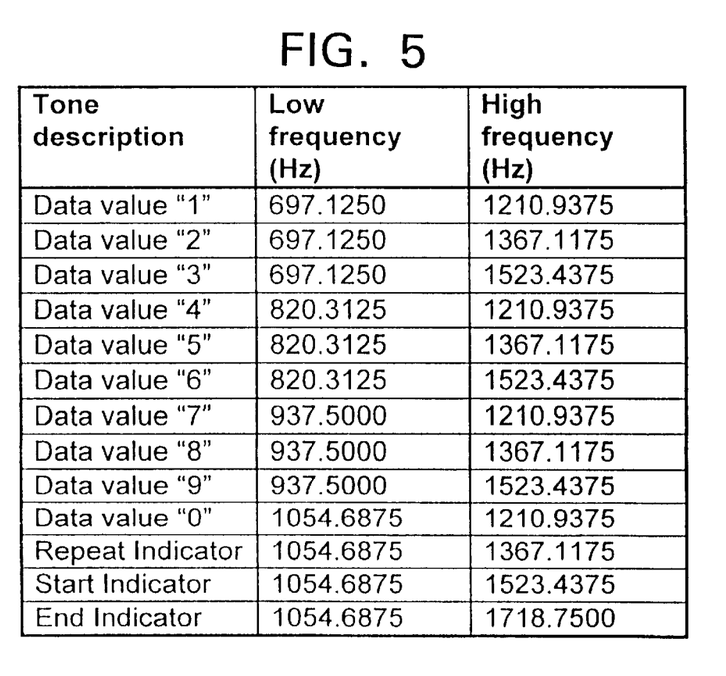

The alpha-numeric control information message thus provided is now encoded character by character into a series of simple audio signals which may be individually composed of single pure tones of different frequencies representing the individual characters which may be used as control information or dual combinations of pure tones as illustrated by the examples of encoding or conversion schemes given in FIGS. 4 and 5. Such single or dual tone signals may be read-out in digital form by the dedicated software from a table 11 storing all possible signal or dual tone signals for the individual characters to be encoded and being addressed from an address generator 11a controlled by the alpha-numeric information entered from the keyboard of the computer 10.

The digital representations read-out from the table 11 control a tone generator 12 generating signal or dual tone signals of different frequencies which are representative of the individual characters of the alpha-numeric control information message. The simple audio signals representing the individual characters are supplied to an assembler device 13 in which a start indicator signal and an end indicator signal are added at the beginning and the end of the information carrying sequence, respectively and assembled therewith to form an audio signal sequence which in this embodiment constitutes the control information message to be incorporated into the overall signal to be transmitted by the server installation 1.

In FIGS. 4 and 5 typical encoding or conversion schemes for single tone generation following CCIR/EEA standards and for a dual tone implementation, respectively, are shown. The tables in the figures indicate the individual audio frequencies assigned to numerical characters (digits) 1 to 0 as well as to the start and end indicator signal's described above and to a repeat indicator signal to be explained in the following for the single tone mode (FIG. 4) and the dual tone mode (FIG. 5) in which the individual audio signals are combinations of a low frequency tone and a high frequency tone.

In the described embodiment of the method and system of the invention where the control information message may typically be incorporated into broadcast radio and television programmes the control information message will typically appear at the site of the user installation in the form of an audible beeping sound signal sequence. In order to achieve a short response time and to avoid inconvenience it is, therefore, an essential feature of the invention that the overall duration of the control information is relatively short, preferably less than 5 seconds.

On the other hand, the individual signal or dual tone signals generated by tone generator 12 must have a duration long enough to be clearly detectable without confusion in the user installation. To accomplish this the individual single or dual tone signals must preferably have a duration in the range from 30 to 150 ms and for practical purposes a duration of 85 ms has proven to be suitable.

The start and end indicator signals added to the information carrying part of the control information message must be clearly distinct from the tone signals representing the individual characters of the alpha-numeric information. Such a distinction can easily be obtained in a simple way by giving these indicator signals a frequency distinctly different from the frequencies of the character representing tone signals and/or a duration which is significantly longer than the duration of the latter, a convenient duration of the indicator signals being in the range from 200 to 600 ms with 450 ms as a suitable value for practical purpose.

Thereby, within the recommended maximum overall duration of 5 seconds a control information message may be formed which in addition to the start and end indicator signals may comprise from 10 to 150 individual characters.

In order to avoid confusion when the same characters is repeated several times in an uninterrupted part sequence of the total control information message, it is preferred that the tone signal representing such a repeated character is replaced at every second occurrence in such an uninterrupted part sequence by a special repeat indicator signal which may be a single or dual tone signal of a frequency different from any of the frequencies assigned to the character representing signals, but of the same duration as these signals.

Figure 6:
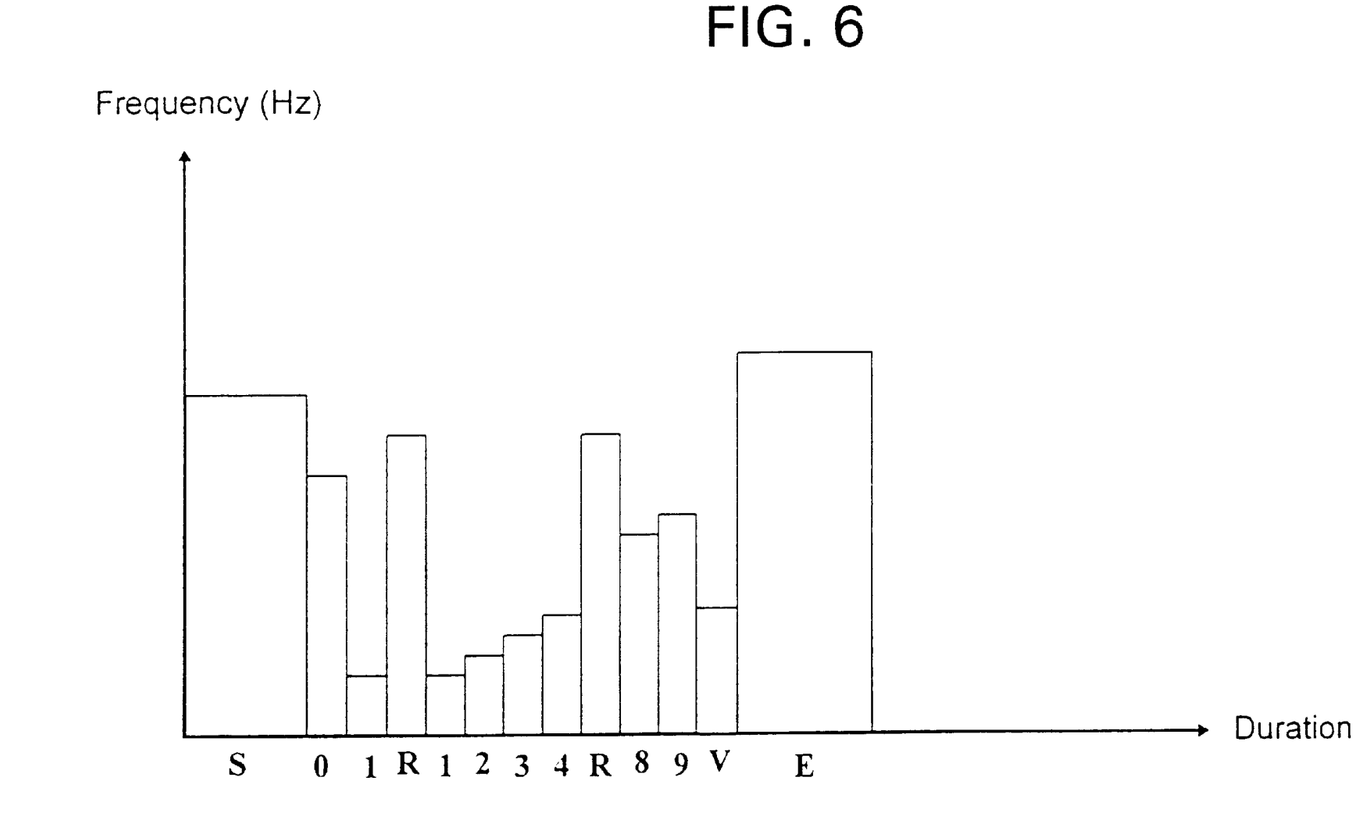
FIG. 6 is a graphical representation of an example of a control information carrying audio signal sequence.

FIG. 6 shows in a graphical representation an example of an audio signal sequence as supplied by the control information generator and encoder 3 by generation of individual character representing tone signals in accordance with the single tone scheme shown in FIG. 4 and representing a very simple control information message composed entirely of numerical characters "0111234489". The start, end and repeat indicator signals are denoted by S, E and R respectively. As will appear the complete audio signal sequence will have the character of a short beeping sound in the example shown with a duration of approximately two seconds.

In order to permit a detection of a transmission error in the user installation it may further be preferred that a relatively simple validation parameter is added to the transmitted control information signal sequence. In the sample case explained above of a message composed of numerical characters only such a validation parameter may be formed e.g. by repeated summation of the individual digits of the numerical message into a single digit which may, in principle, be encoded into a tone signal in the same way as the real characters of the control information message. To allow distinction of the validation parameter tone signal from the character representing tone signals the former may e.g. be assigned a predetermined location within the signal sequence, e.g. as the first tone signal after the start indicator or, as shown in the example in FIG. 6, where the validation parameter V calculated in accordance with the summation described above will be 4, as the last tone signal before the end indicator.

Figure 3:
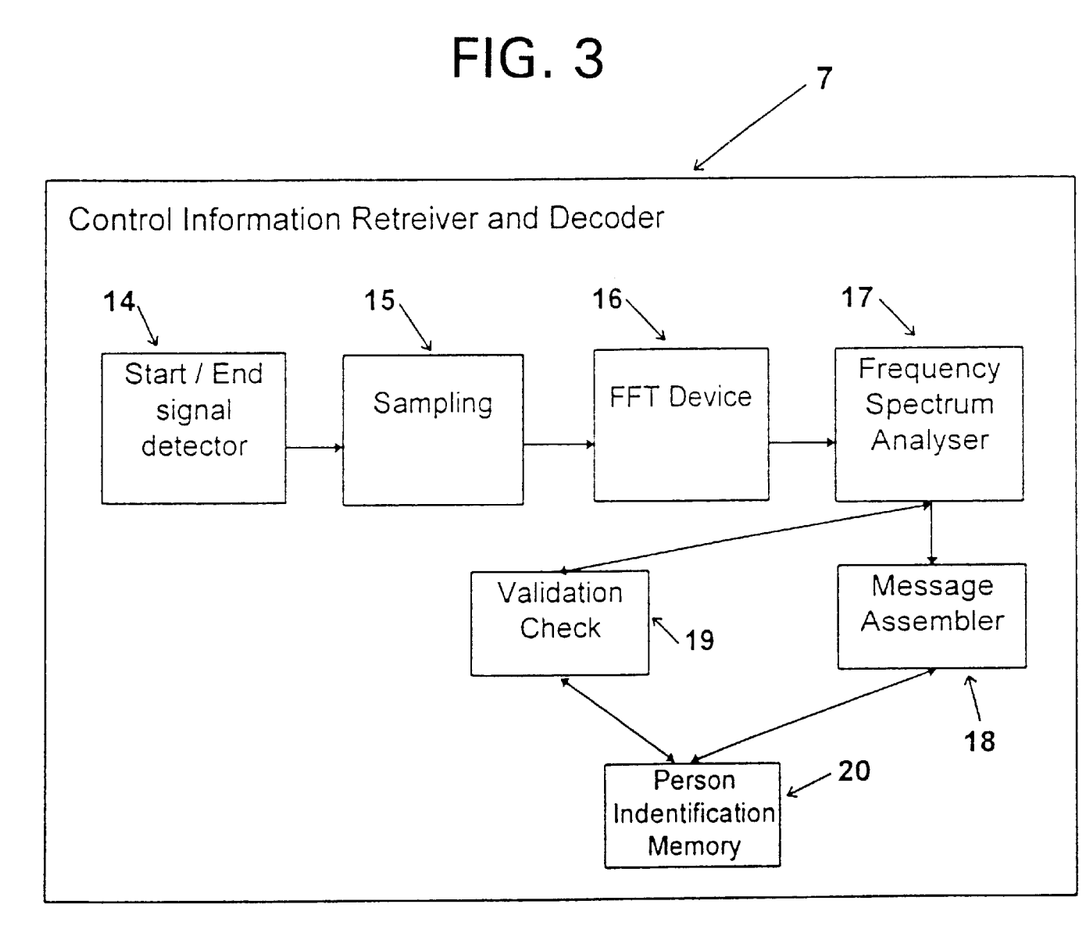
FIG. 3 illustrates the retrieval of a simple audio signal and decoding of the control information in a computer installation controlled thereby.

In FIG. 3 the control information message retriever and encoder 7 of the user installation 2 in FIG. 1 is shown in further detail. The overall signal transmitted from the server installation 1 and received by the receiver 6 in the user installation is supplied to a start and end indicator signal detector 14. By detection of a start indicator signal the following signal sequence is supplied to a sampling device 15 in which the received audio signal components are converted into digital PCM (pulse code modulated) data which are suitable for further analysis in the retriever and decoder 7.

The PCM data from the sampling device 15 are processed in a device 16 by Fast Fourier Transformation (FFT) and supplied to a frequency spectrum analyzer 17 detecting the frequencies of the individual components of the sample signal sequence and thereby regenerating the individual character of the original alpha-numeric control information message generated in the server installation 1. The data stream resulting from the frequency spectrum analysis is supplied to a message assembler 18 forming the original message.

The output data sequence from frequency analyzer 17 will also include the validation parameter and is supplied in a device 19 to a validation check performing for the individual characters of the data sequence a validation to calculate a validation parameter in accordance with the same calculation as used in the server installation 1 and comparing this calculated validation parameter with the validation parameter transmitted from the server installation as part of the control information message. This comparison is performed after detection of the end indicator signal by detector 14.

Only by a positive result of the validation check in device 19 the assembled control information message a is passed on to the data processor 8 of the user computer installation.

It is important to note that in practice the functions of all devices 10 to 13 of the control information generator and decoder 3 in the server installation 1 and all devices 14 to 19 in the control information retriever and decoder 7 of the user installation 2 may be software-implemented in a personal computer, so that these devices will normally not appear as individual structural components of the system of the invention.

In the described embodiment of a control information message in the form of an audio signal sequence a personal computer equipped with a sound card may be used. In the server installation the sound card will perform the function of the tone generator 12 and in the user installation 2 the sound card will perform the functions of the detector and sampling devices 14 and 15.

In the method and system described so far and in the case where the control information message is incorporated in a broadcast radio or television signal the control information message will be received and processed by any member of the listening or viewing public in possession of a personal computer with a sound card and the dedicated software necessary for performing the functions of devices 14 to 19 of the control information retriever and decoder 7 of the user installation 2.

According to an important further development of the method and system of the invention it is also possible, however, to transmit the control information message by a targeted transmission to specifically selected groups of users or even a specifically selected individual.

To accomplish that the control information retriever and decoder 7 of the user installation 2 may as shown in FIG. 3 include a memory part 20 with stored personal information concerning the actual user such as name and address, date of birth, sex, occupation etc. which will identify the user as belonging to any of a number of specific groups, and in the server installation targeted address information to enable use of the transmitted control information message only by members of such a specific group will then be added to the control information message by the initial generation thereof in the personal computer 10, such targeted address information including at least one parameter specific to one group of users.

Figure 7:
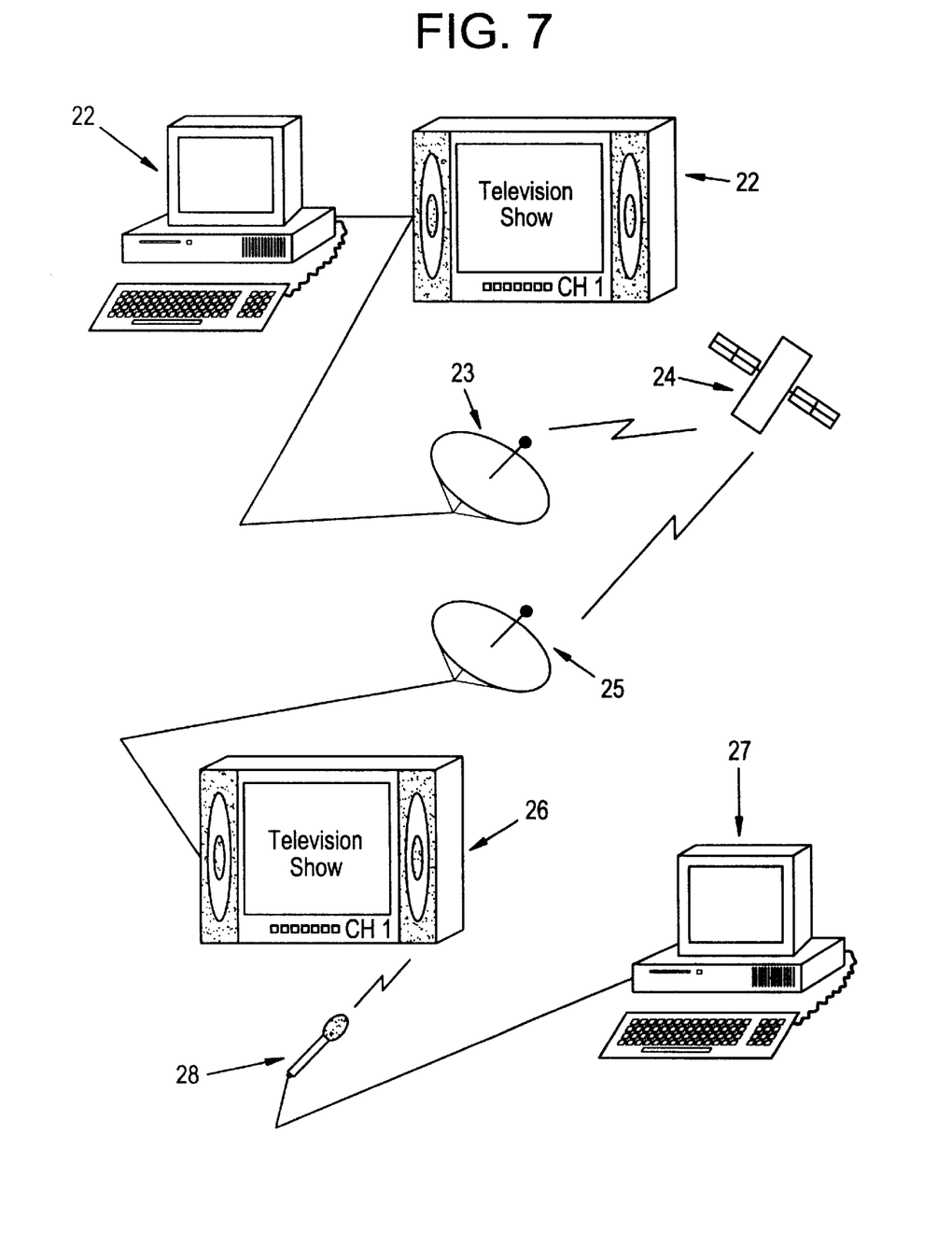
FIGS. 7 and 8 show practical applications of the method and system of the invention in generalized schematical representations.

FIG. 7 shows by way of example application of the method and system for the case of a satellite transmitted television programme already referred to in the foregoing. Such a television programme may typically be a tv entertainment show or an educational or business programme, but the application possibilities are numerous and in no way limited to such types of programmes.

The function of the server installation described in the foregoing are performed by a personal computer 21 linked to conventional tv recording and transmission equipment shown in the figure by a tv set 22 from which television signals are transmitted to the satellite transmission earth facility symbolically shown by a parabola 23 from which signals are transmitted in conventional way to an orbiting satellite 24 retransmitting the signals to a user earth facility as symbolically shown by a parabola 25 from which the television signals are transmitted through a cable connection to a tv receiver 26 linked with user installation.

As already mentioned in the described embodiment of a control information message in the form of an audio signal sequence the user installation may comprise a personal computer equipped with sound cards. The audio signal part of the television signals can be supplied to the user installation computer 27 either by a so-called SCART-cable connecting the computer installation with the tv-set or as shown in figure by picking up the sound from the tv receiver loud speaker system by means of a microphone 28 connected with the usual microphone inlet to the computer sound card installation.

The example shown in FIG. 7 of incorporating the control information message into a broad cast television signal is, however, by no means limiting for the application of the method and system of the invention. Thus, it is perfectly possible to have a video programme incorporating the control information message recorded in conventional way on a tape which can either be used for later transmission or be directly purchased or acquired by users. Evidently it is also possible on the user side to link the tv set with a video recording apparatus in order to make an initial recording of the programme incorporating the control information method and perform a playback of the programme including the control information message at a later time.

Figure 8:
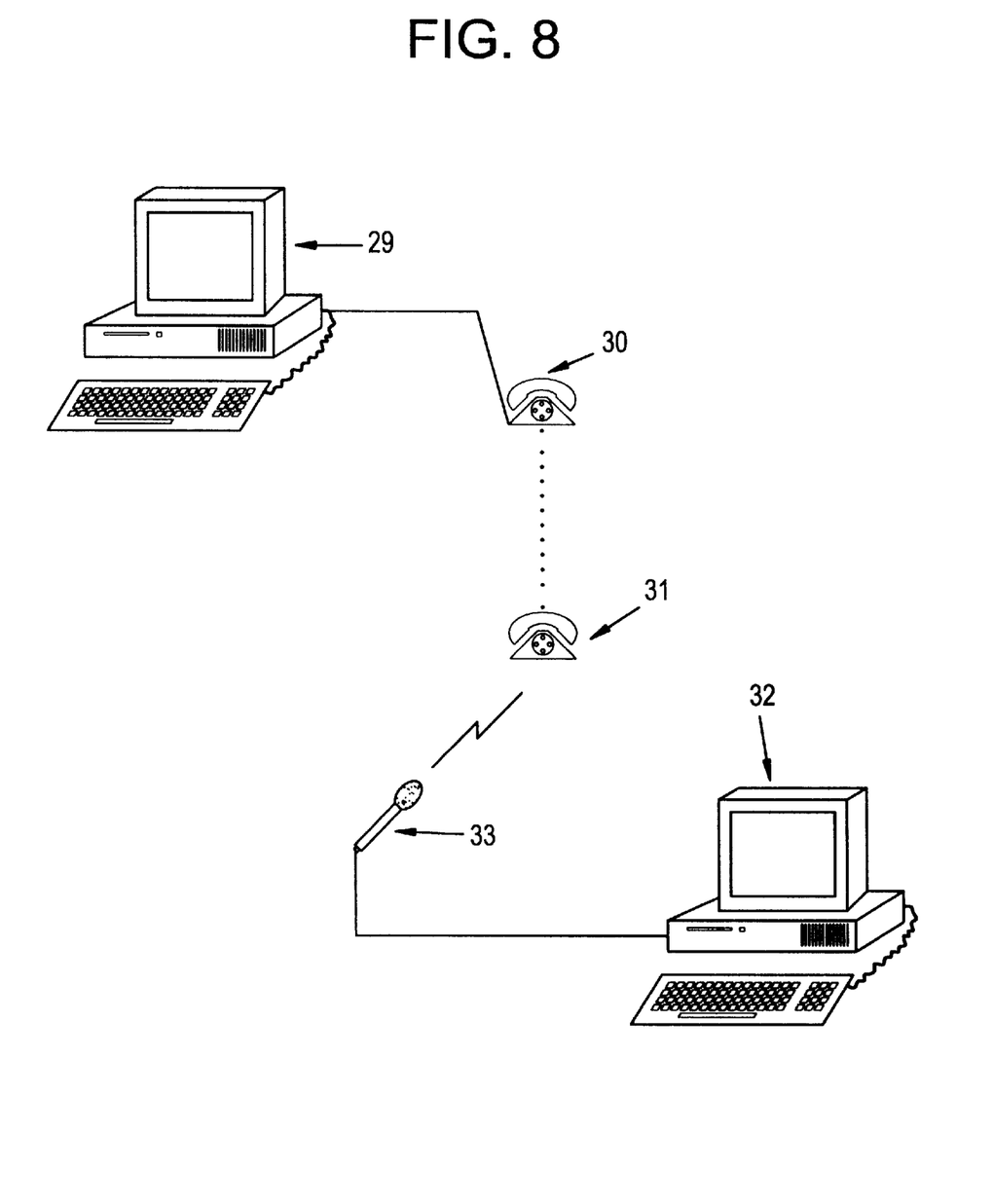

Neither is the transmission of the control information method as part of an overall signal in the form of a television signal limiting to the application of the method and the system of the invention. As shown by way of example in FIG. 8 another application possibility is to use transmission by way of telephone communication where the computer 29 in the server installation is connected with a telephone installation 30 connected through a conventional telephone network, which may include any type of such networks, with a telephone installation 31 connected with the user installation computer 32. Also in this case the signal received by the user telephone installation 31 may be transmitted to the computer installation 32 either through a cable connection or as shown in the figure by being picked up by a microphone 33.

As already mentioned in the foregoing the actual implementation of the method and system of the invention in the user installation will in addition to the dedicated software performing the function of the control information retriever and decoder in FIG. 3 and constituting the user interface between the receiver 6 and the memory 8 and processor 9 in the user computer installation require some form of application software with a stored programme controlling the type of action to be initiated in response to the received control information message. Depending on the actual application such actions may take many different forms, e.g. showing a picture, playing a video recording, starting a video game or a part thereof etc. and the method and system of the invention is in no way limited to any specific type of action to be initiated by the transmitted control information message.

In general user applications will be highly dependent on the actual field of use of the method and system of the invention.

Important specific uses of the method and the system of the invention according to the embodiment described in the foregoing where the control information method is transmitted as part of a radio or television signal is to allow interactive listener/viewer participation in a broadcast radio or television programme or interactive communication between the user computer installation programme including the control information methods recorded on a record carrier. A typical example of such use could for example be interactive participation of TV viewers in TV entertainment programmes like the well known "Wheel of Fortune"® allowing the person operating the user computer installation to take individual part in the game alongside with the direct participation in the TV show.

Another important field of use is the targeted transmission of a control information message to specific groups of persons. In this application, the method and system of the invention can be used for direct mailing or advertising, e.g. by having users of a selected group acquiring or purchasing a programme, controlling one or more actions to be taken in response to the control information message, recorded on a conventional computer record carrier such as a CD-ROM and then addressing persons belonging to the specific group with a control information message which could be transmitted e.g. as a part of a TV commercial or by direct telephone communication.

For the example described in the foregoing with reference to FIG. 7 it is evident that the broadcast signal with which the control information message is transmitted need not be a television signal, but could also be a radio signal containing only audio information.

It is further within the scope of the invention to apply the method and system to two-way communication between a server installation and one or more user computer installations. In such a case dedicated software performing the functions of the control information generator and encoder on the server side as well as the control information retriever and decoder on the user side must be present both in the server installation and the user installation.

Whereas the method and system of the invention has been described in the foregoing mainly by way of the embodiment involving encoding the control information message into an audio signal sequence and retrieving the original control information message on the user side by decoding such a transmitted audio signal sequence, the invention is not limited to this, since the control information message could be encoded into other signal forms such as a digital signal, eventually in encrypted or compressed form, and incorporated in an overall signal carrying audio and/or video information in digital form.

One type of highly actual applications of the method and system of the invention which could be foreseen are uses in which the action initiated by the transmitted control information message involves the establishment of communication between the user installation and the "Internet" or similar types of computer networks. For example, in the broadcasting of news on TV or radio this application will allow providing the user with access to more in-depth background information incorporated e.g. in a homepage for the news station by transmitting a control information message during the transmission of a specific news item.

I claim:

1. A method for initiating an action controlled by a pre-stored program in one or more computer installations by communication of a control information message from a control information generator in a server installation remote from said one or more computer installations, comprising the steps of generating said control information message in the control information generator as a message of alpha-numeric information, encoding said message into a signal sequence of a relatively short duration, adding a start indicator signal and an end indicator signal at the beginning and end of said signal sequence, incorporating said signal sequence with said start and end indicator signals into an overall audio or video information carrying signal comprising signal parts from other signal sources than said control information generator, communicating said overall signal to said one or more computer installations, retrieving said signal sequence from said overall signal at each of said computer installations, decoding said signal sequence into said message of alpha-numeric information, and using said message to initiate said action in each of said computer installations, said action being of a duration substantially longer than said relatively short duration and comprising other than the reproduction of information contained in said control information message.

2. A method as claimed in claim 1, wherein said signal sequence comprises a series of audio signals representing individual characters of said message of alpha-numeric information, and said start and end indicator signals are audio signals distinct from said character representing signals.

3. A method as claimed in claim 1, wherein said relatively short duration of said signal sequence is less than 5 seconds.

4. A method as claimed in claim 3, wherein each information character of said message is encoded into an audio sound signal taken from a table of representations of predetermined audio sound signals.

5. A method as claimed in claim 4, wherein said representations control the generation of distinct audio sound signals comprising pure tone signals of separate frequencies or combinations thereof.

6. A method as claimed in claim 5, wherein each of said tone signals or combinations has a duration of 30 to 150 ms.

7. A method as claimed in claim 4, wherein the retrieval of said signal sequence comprises sampling of said audio sound signals into digital PCM data and performing a frequency spectrum analysis of said PCM data.

8. A method as claimed in claim 7, wherein said PCM data are subjected to Fast Fourier transformation prior to said frequency spectrum analysis.

9. A method as claimed in claim 4, wherein a repeat indicator audio sound signal distinct from any of said predetermined audio signals is substituted for said audio sound signal at every second occurrence of a character in an uninterrupted part sequence of identical characters within said message.

10. A method as claimed in claim 9, wherein said repeat indicator signal is a tone signal having the same duration as said pure tone signal or combinations, but a frequency different from the frequency or frequencies of any character representing tone signal or combinations thereof.

11. A method as claimed in claim 1, wherein said start and end indicator signals have a duration which is substantially longer than the duration of said pure tone signals.

12. A method as claimed in claim 11, wherein said duration is 200–600 ms.

13. A method as claimed in claim 1, wherein a validation signal is added to said signal sequence and a validation check is performed on the reconverted alpha-numerical information in each of said computer installations.

14. A method as claimed in claim 13, wherein said overall signal forms part a recorded audio and/or video signal on a record carrier available at each of said computer installations and a playback of said record carrier is performed prior to said retrieval of said signal sequence.

15. A method as claimed in claim 14 for interactive communication between a program recorded on a record carrier and said computer installation.

16. A method as claimed in claim 14, wherein the action initiated by said message comprises interactive communication between the program stored on said record carrier and said computer installation.

17. A method as claimed in claim 1, wherein said overall signal forms part of a broadcast radio or television signal.

18. A method as claimed in claim 17, wherein an identification signal is added to said signal sequence to identify any of a number of message suppliers in a multitasking system.

19. A method as claimed in claim 12, wherein person identification information is provided at each of said computer installations to identify data for a user of said installation as belonging to any of a number of specific groups of persons, where each group is defined by at least one common personal data parameter, and further comprising the steps of adding addressing information to the message generated by said control information generator to address at least one of said groups and using the reconverted message in the computer installations to initiate a prestored computer program specific for said group or groups.

20. A method as claimed in claim 19 for addressing specific target groups for direct mailing or advertising.

21. A method as claimed in claim 19, wherein the action initiated by said message comprises direct mailing or advertising targeted to any of said specific groups.

22. A method as claimed in claim 17 for interactive listener/viewer participation in a broadcast radio or television program.

23. A method as claimed in claim 17, wherein the action initiated by said message comprises interactive listener/viewer participation in a broadcast radio or television program.

24. A method as claimed in claim 1, wherein a two-way communication is effected between said server installation and any of said computer installations.

25. A system for initiating an action controlled by a pre-stored program in one or more computer installations by communication of control information from a control information generator remote from said one or more computer installations, said control information generator comprising:
means for generating said control information in the form of a message of alpha-numeric information,
means for encoding said message into a signal sequence of a relatively short duration, said control information generator forming part of a server installation comprising
means for incorporating said signal sequence with said start and end indicator signals into an overall audio and/or video information carrying signal comprising signal parts from other sources than said control information generator,
means for adding a start indicator signal and an end indicator signal at the beginning and end of said sequence
means for communicating said overall signal including said signal sequence with said start and end indicator signals to said one or more computer installations, and
each of said computer installations comprising
means for retrieving said signal sequence from said overall signal,
means for decoding said signal sequence into said message of alpha-numeric information, and
means for using said message to initiate said action controlled in each of said computer installations, said action being of a duration substantially loner than said relatively short duration and comprising other than the reproduction of the information contained in said control information message.

26. A system as claimed in claim 25, wherein said encoding means comprising means for encoding said message into a series of audio signals representing individual characters of said alpha-numeric information and said receiver device comprises an audio receiver part.

27. A system as claimed in claim 26, wherein said relatively short duration is less than 5 seconds.

28. A system as claimed in claim 27, wherein said encoding means comprises means for encoding each information character of said message into a representation of an audio sound signal, a table of representations of predetermined audio sound signals identifying each such information character, and means for addressing said table to read-out a specific representation of a sound signal identifying said character.

29. A system for initiating an action controlled by a prestored programme in one or more computer installations (2) by communication of control information from a control information generator (3) remote from said one or more computer installations, said control information generator (3) comprising
means (10) for generating said control information in the form of a message of alpha-numeric information,
means (11, 12) for encoding said message into a signal sequence of a relatively short duration,
said control information generator (3) forming part of a server installation (1) comprising
means (4) for incorporating said signal sequence into an overall audio and/or video information carrying signal comprising signal parts from other sources than said control information generator (3), means (13) for adding a start indicator signal and an end indicator signal at the beginning and end of said sequence, and means for communicating said overall signal including said signal sequence with said start and end indicator signals to said one or more computer installations (2), and each of said computer installations (2) comprising means (7) for retrieving said signal sequence from said overall signal, means (15–19) for decoding said signal sequence into said message of alpha-numeric information, and means (9) for using said message to initiate said action controlled in each of said computer installations, said action being of a duration substantially longer than said relatively short duration.

30. A system as claimed in claim 28, wherein said retrieving means at each of said computer installations comprises means for sampling of said audio sound signals into digital PCM data and a frequency spectrum analyzer to perform a frequency spectrum analysis of said PCM data.

31. A system as claimed in claim 30, wherein said relatively short duration less than 5 seconds.

32. A system as claimed in claim 28, wherein said control information generator comprises means for generating a repeat indicator audio sound signal distinct from any of said predetermined audio signals and means for substituting said repeat indicator signal for said audio sound signal at every second occurrence of a character in an uninterrupted part sequence of identical characters within said message.

33. A system as claimed in claim 25, wherein said server installation comprises means for adding a validation signal to said signal sequence and each of said computer installations comprises means for performing a validation check on said reconverted message.

34. A system as claimed in claim 25, wherein said server installation forms part of a broadcasting system for radio or television signals.

35. A system as claimed in claim 34, wherein said broadcasting system comprises means for adding an identification signal to said signal sequence to identify any of a number of message suppliers in a multitasking system.

36. A system as claimed in claim 34 for interactive listener/viewer participation in a broadcast radio or television program.

37. A system as claimed in claim 25, wherein said server installation comprises recording means for recording said overall signal on a record carrier and each of said computer installations comprises a playback apparatus for said recorded overall signal.

38. A system as claimed in claim 37 for interactive communication between a program recorded on a record carrier and said computer installation.

39. A system as claimed in claim 25, wherein each of said computer installations comprises means for storing person identification information to identify data for a user of said installation as belonging to any of a number of specific groups of persons, where each group is defined by at least one common personal data parameter, and said server installation comprises means for addressing information to said message to address at least one of said groups.

40. A system as claimed in claim 39 for addressing specific target groups for direct mailing or advertising.

41. A system as claimed in claim 25, wherein each of said computer installations comprises a memory of prestored computer programs and means for using said reconverted message to initialize one of said prestored computer programs.

* * * * *